United States Patent
Rana et al.

(10) Patent No.: US 10,531,317 B1
(45) Date of Patent: Jan. 7, 2020

(54) SYSTEM, METHOD, AND COMPUTER PROGRAM FOR PERFORMING INTELLIGENT RADIO ACCESS NETWORK (RAN) MANAGEMENT

(71) Applicant: Amdocs Development Limited, Limassol (CY)

(72) Inventors: Shekhar Rana, Baghpat District (IN); Alok Kumar Sinha, New Delhi (IN); Krishnan Venkataraghavan, Chennai (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/183,585

(22) Filed: Nov. 7, 2018

(51) Int. Cl.
*H04W 24/02* (2009.01)
*H04W 52/02* (2009.01)
*H04W 24/08* (2009.01)

(52) U.S. Cl.
CPC .......... *H04W 24/02* (2013.01); *H04W 24/08* (2013.01); *H04W 52/0203* (2013.01)

(58) Field of Classification Search
CPC .. H04W 24/02; H04W 24/08; H04W 52/0203
See application file for complete search history.

(56) References Cited

U.S. PATENT DOCUMENTS

| 8,483,121 | B2 | 7/2013 | Lindgren et al. | |
|---|---|---|---|---|
| 9,717,048 | B2 | 7/2017 | Zhang | |
| 2010/0228854 | A1* | 9/2010 | Morrison | H04L 29/00 709/224 |
| 2012/0244869 | A1* | 9/2012 | Song | H04W 52/0206 455/449 |
| 2013/0151700 | A1 | 6/2013 | Liu et al. | |
| 2014/0012428 | A1* | 1/2014 | Taniguchi | H02J 7/35 700/291 |

FOREIGN PATENT DOCUMENTS

| EP | 2468027 B1 | 7/2013 |
|---|---|---|
| EP | 2919531 A1 | 9/2015 |
| GB | 2392054 A | 2/2004 |

* cited by examiner

*Primary Examiner* — Said M Elnoubi
(74) *Attorney, Agent, or Firm* — Zilka-Kotab, P.C.

(57) ABSTRACT

A system, method, and computer program product are provided for performing intelligent RAN energy management. In operation, a system correlates information including site configuration details, RAN attributes, and energy consumption attributes for each of a plurality of areas including sites, clusters, or zones. The system assigns each of the plurality of areas to one of a plurality of categories based on similar characteristics including associated site configuration details and RAN attributes. Further, the system identifies one of more of a plurality of sites in each of the plurality of categories as bad for energy consumption based on the energy consumption attributes associated with a particular category.

16 Claims, 6 Drawing Sheets

| | | Sum | Sum | Average | |
| | | 6683 | 1145755 | | |
| Category | Site | Et | KB | Et/KB | Offender |
|---|---|---|---|---|---|
| 1 | Test15 | 564 | 25800 | 0.021860465 | Yes |
| 1 | Test2 | 324 | 20000 | 0.0162 | Yes |
| 1 | Test5 | 453 | 35000 | 0.012942857 | Yes |
| 1 | Test13 | 587 | 45600 | 0.012872807 | Yes |
| 1 | Test16 | 369 | 29000 | 0.012724138 | Yes |
| 1 | Test14 | 443 | 48955 | 0.009049127 | Yes |
| 1 | Test22 | 259 | 35000 | 0.0074 | Yes |
| 1 | Test23 | 325 | 46500 | 0.006989247 | Yes |
| 1 | Test10 | 213 | 34600 | 0.006156069 | Yes |
| 1 | Test17 | 218 | 37000 | 0.005891892 | Yes |
| 1 | Test7 | 245 | 43000 | 0.005697674 | Yes |
| 1 | Test20 | 431 | 77000 | 0.005597403 | No |
| 1 | Test1 | 200 | 38000 | 0.005263158 | No |
| 1 | Test6 | 323 | 67000 | 0.004820896 | No |
| 1 | Test12 | 256 | 54600 | 0.004688645 | No |
| 1 | Test18 | 222 | 54500 | 0.004073394 | No |
| 1 | Test19 | 230 | 65800 | 0.003495441 | No |
| 1 | Test9 | 187 | 56900 | 0.003286467 | No |
| 1 | Test11 | 224 | 76000 | 0.002947368 | No |
| 1 | Test8 | 154 | 56000 | 0.00275 | No |
| 1 | Test3 | 124 | 50000 | 0.00248 | No |
| 1 | Test4 | 145 | 60000 | 0.002416667 | No |
| 1 | Test21 | 187 | 89500 | 0.002089385 | No |

SYSTEM, METHOD, AND COMPUTER PROGRAM FOR PERFORMING INTELLIGENT RADIO ACCESS NETWORK (RAN) MANAGEMENT

FIELD OF THE INVENTION

The present invention relates to energy consumption in radio access networks, and more particularly to a system for intelligent radio access network management.

BACKGROUND

Enormous growth in mobile telecommunications around the globe, coupled with the emergence of data-intensive Internet use and new network standards, has poised the telecommunications industry for increasing amounts of power and energy services. Service Providers have huge energy costs running into millions of dollars and are looking for ways to reduce these costs that adversely affect their profitability.

There is thus a need for addressing these and/or other issues associated with the prior art.

SUMMARY

A system, method, and computer program product are provided for performing intelligent RAN energy management. In operation, a system correlates information including site configuration details, RAN attributes, and energy consumption attributes for each of a plurality of areas including sites, clusters, or zones. The system assigns each of the plurality of areas to one of a plurality of categories based on similar characteristics including associated site configuration details and RAN attributes. Further, the system identifies one of more of a plurality of sites in each of the plurality of categories as bad for energy consumption based on the energy consumption attributes associated with a particular category.

DETAILED DESCRIPTION

Figure 1:
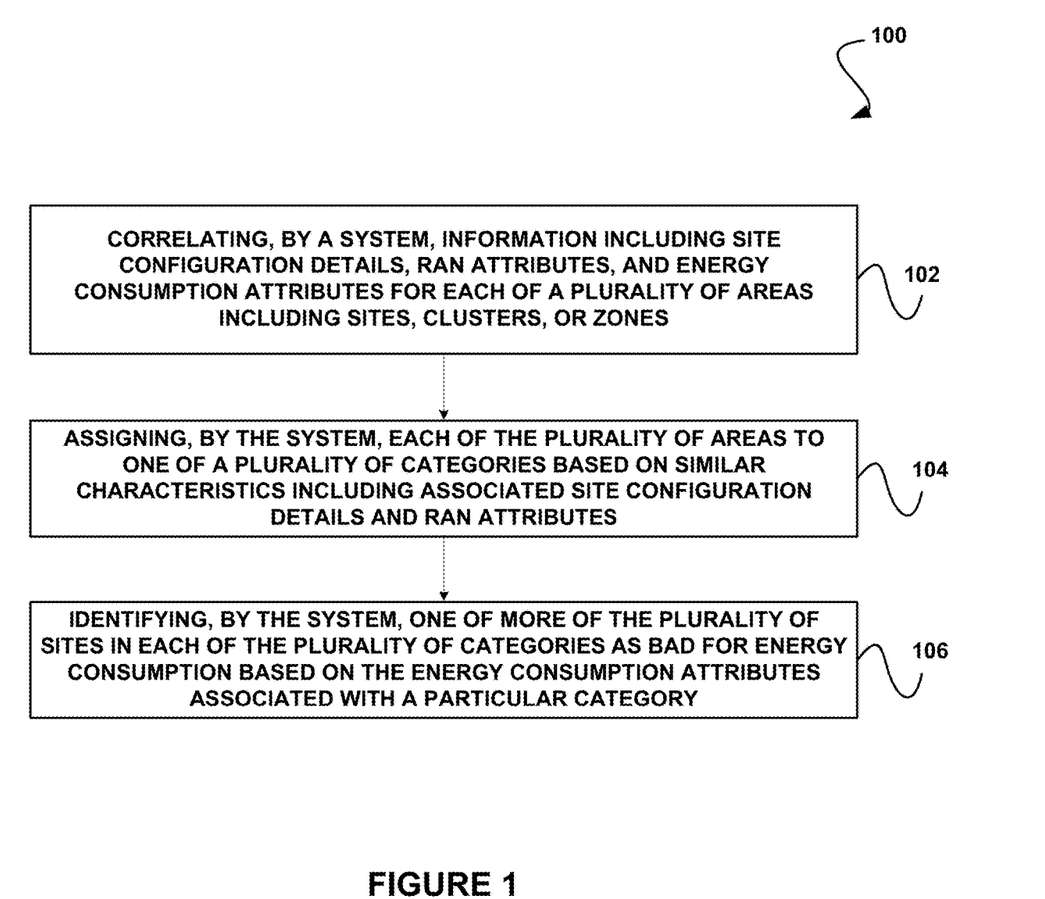
FIG. 1 illustrates a method for performing intelligent RAN energy management, in accordance with one embodiment.

FIG. 1 illustrates a method 100 for performing intelligent RAN energy management, in accordance with one embodiment.

In operation, a system correlates information including site configuration details, RAN attributes, and energy consumption attributes for each of a plurality of areas (e.g. sites, clusters, or zones). See operation 102. The energy consumption attributes may include variety of energy consumption based information, such as an hourly, daily, weekly, and/or monthly calculation of energy consumed for each of the plurality of areas, etc. The RAN attributes may include any information associated with the RAN. For example, in one embodiment, the RAN attributes may include a value of a total volume of data consumed for each of the plurality of areas.

The site configuration details may include any information associated with a sites/areas. For example, the site configuration details may be associated with one or more of band, carrier bandwidth, transmit power, and hardware information, etc. The areas may represent sites, clusters, or zones and may be associated with any type RAN, such as LTE, etc.

The system assigns each of the plurality of areas to one of a plurality of categories based on similar characteristics including associated site configuration details and RAN attributes. See operation 104. In one embodiment, each of the plurality of categories may be associated with a rural area, a sub-urban area, an urban area, or a dense-urban area.

Further, the system identifies one of more of a plurality of sites in each of the plurality of categories as bad for energy consumption based on the energy consumption attributes associated with a particular category. See operation 106. In this context, bad for energy consumption means that the area consumes more energy than other comparable areas. In one embodiment, this may include assigning a rank to each of the plurality of areas falling in each of the plurality of categories.

Additionally, in one embodiment, the system may perform a root cause analysis on the one of more of the plurality of areas identified as bad for energy consumption to determine a cause of the energy consumption issue. Further, in one embodiment, the system may perform a delta calculation between a top offender and best performing cells.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
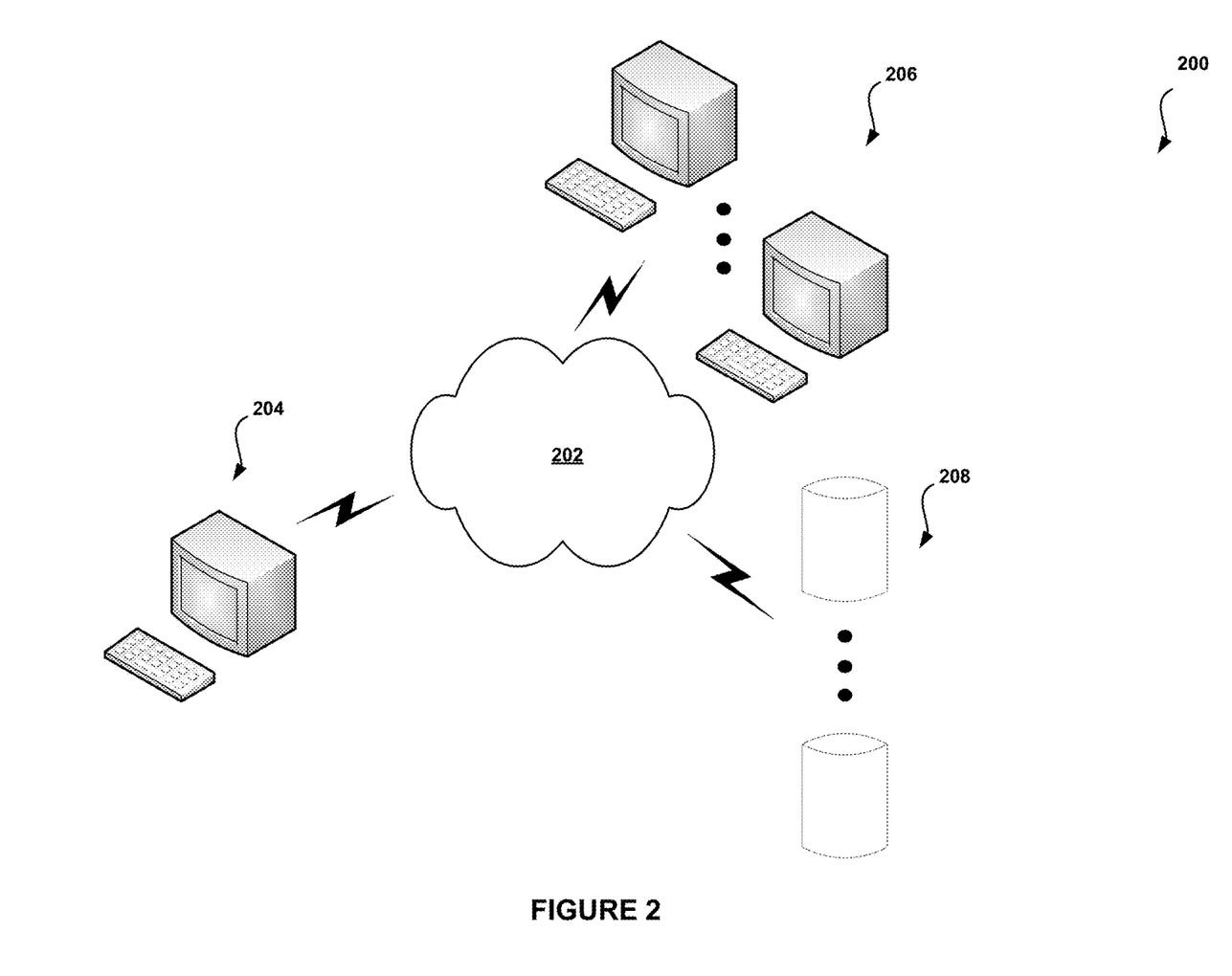
FIG. 2 shows a system for performing intelligent RAN energy management, in accordance with one embodiment.

FIG. 2 shows a system 200 for performing intelligent RAN energy management, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a management system 204, which may implement a variety of applications or software, etc. The management system 204 may be capable of communicating with a plurality of systems 206, either directly or over one or more networks 202, for performing intelligent RAN energy management. The management system 204 may also be in communication with one or more repositories/databases 208.

Network energy consumption is a significant cost for mobile broadband operators. In mature markets, energy accounts for 10-15% of total network operating expenses (OPEX) and can reach up to 50% in developing markets with a high number of off-grid sites, or where only a poor quality electricity grid is available.

The mobile broadband network can be viewed in two major sections: the operators' part, which includes the Mobile Switching Center (MSC) and Radio Base Station (RBS), and the subscribers' part, normally limited to the handheld device. Estimates indicate more than 90 percent of wireless network energy consumption comes from the operators. With an exponential rise in installed Base Transceiver Station (BTS) cabinets in the world every year and an estimated double-digit growth rate, the impact of any energy savings at this point is significant.

Three main wireless broadband technologies are mobile WiMAX (Worldwide Interoperability for Microwave Access), HSPA (High Speed Packet Access), and LTE (Long Term Evolution). Mobile WiMAX is based on the IEEE 802.16 standard. It operates in the 2-6 GHz band and is developed for mobile wireless applications and allows people to communicate while they are moving. The highest supported bit rate is approximately 70 Mbps. HSPA is the successor of the widely deployed UMTS (Universal Mobile Telecommunications System). HSPA provides increased performance by using improved modulation schemes and by refining the protocols by which handsets and base stations communicate. The end-user experience is further improved by increasing the peak data rates up to 14 Mbps in the downlink. HSPA uses the 2.1 GHz band. LTE is the newest wireless broadband technology. LTE is marketed as the fourth generation (4G) of radio technologies. Targets for the bit rate are to have peak data rates from 10 Mbps up to 300 Mbps in the downlink. With the introduction of LTE-pro feature like Gigabit, even 1 Gbps of peak data rate is possible.

In wireless access networks, however, optimization can be achieved by utilizing hybrid hierarchical base station deployment. When using base stations with differentiated cell sizes and wireless network technologies, a basic access network can be created providing a low bit rate but high coverage to the users. In the hierarchical layers above, base stations with smaller cell sizes but higher bit rates can be utilized to provide the high bandwidth connections when these are required. The advantage is that the higher layers can be put to sleep and only need to be activated with high traffic demand.

With the idle components in the telecommunication networks switched off, the next step is to reduce the load on the remaining components. This strategy will be especially important in access networks since we already pointed out it is difficult to switch off elements.

The solution for efficient energy consumption in a data intensive LTE network described herein and implemented by the management system 204 considers three key constructs: 1) the energy accounts for 10-50% of OPEX depending on market, where Network Management and Control is one key approach to reduce it; 2) in a wireless network, more than 90% energy consumption comes from operator's side and more than 60% of power is used by the RBS or base station; and 3) the wireless technology consumes more power as compared to wireline technologies. Switching off the components, reducing the load, and tuning relevant parameter/feature sets to optimize power consumption are some ways of power consumption optimization.

The new implementation employed by the management system 204 revolves around the RAN side of a data intensive LTE network (or another type of network) as it is the main area of concern (construct 2) from an energy consumption perspective.

The management system 204 utilizes an intelligent energy-RAN management and a control algorithm by automating the key attributes pertaining to energy consumption and correlating it with relevant RAN attributes, this correlation will serve the basis of root cause analysis and, based on the output, a series of reduction in energy consumption decisions can be taken.

One of the most significant outputs of the management system 204 is a comparative correlation of energy consumption of sites with similar configuration and almost same traffic pattern. Energy consumed per kilo bit (Ec/Kb) will be the key attribute that can be derived out of this correlation and the same can be used to identify the problematic set of sites in the network and will be used to perform the root cause analysis.

This implementation is not just limited to LTE network and is agnostic of technology and can be replicated to legacy technologies like 2G, 3G, WiFi and upcoming technology like 5G.

Figure 3:
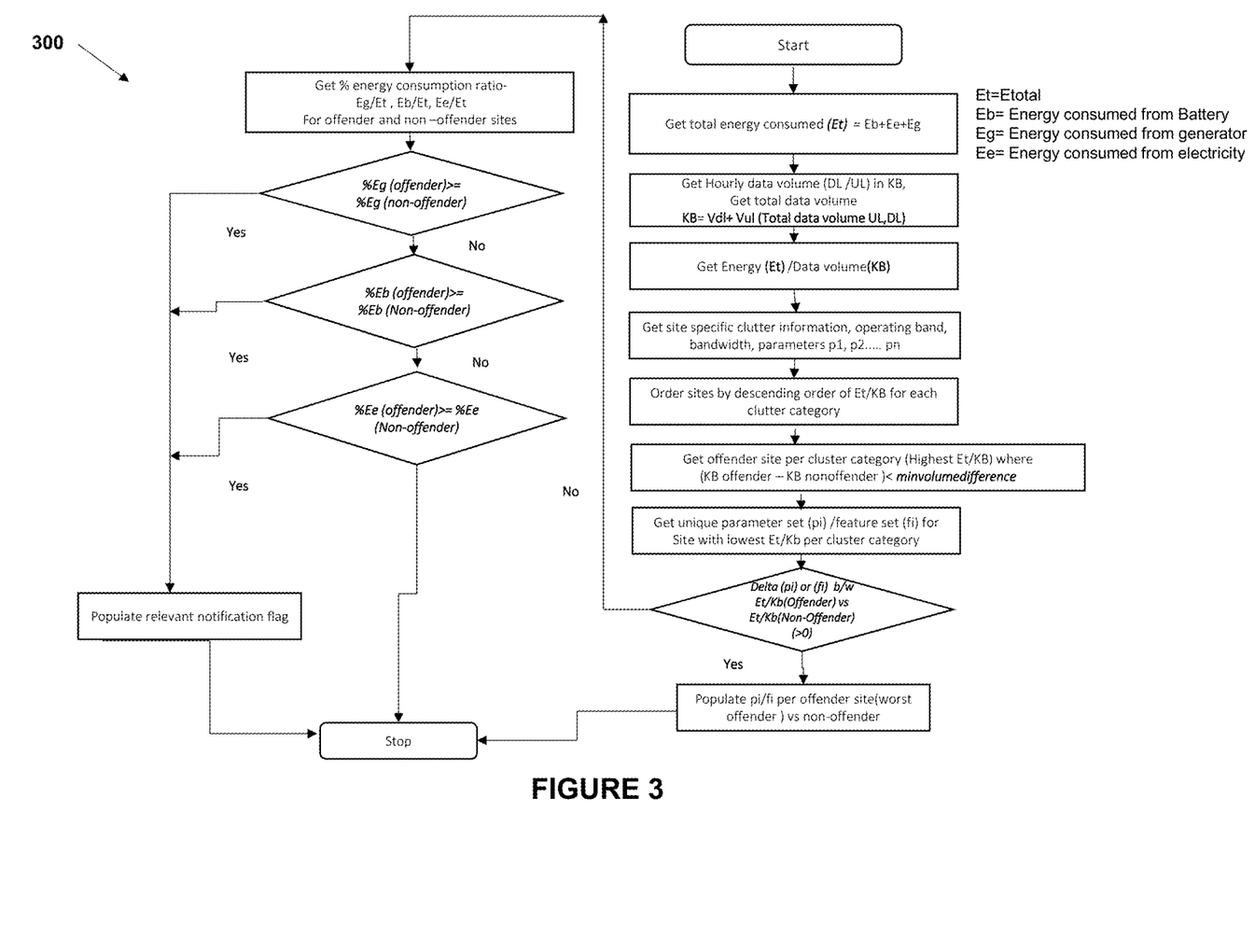
FIG. 3 shows a flow diagram illustrating a high level algorithm for Intelligent Energy-RAN management, in accordance with one embodiment.

FIG. 3 shows a flow diagram 300 illustrating a high level algorithm for Intelligent Energy-RAN management, in accordance with one embodiment. As an option, the flow diagram 300 may be implemented in the context of the details of the previous figures and/or any subsequent figure(s). Of course, however, the flow diagram 300 may be implemented in the context of any desired environment. Further, the aforementioned definitions may equally apply to the description below.

The following steps describe the flow diagram 300, which may be implemented by the management system 204, in more detail.

Step 1: Hourly calculation of energy consumed by an eNodeB from 3 main source of power: generator (Eg), battery (Eb) and main electricity (Ee): Total energy consumed (Et)=Eg+Eb+Ee.

Step 2: Hourly value of total volume of data consumed by an eNodeB in downlink (DL) and uplink (UL) in kilobit, Data Volume DL and Data Volume UL. Total Data volume=Data volume DL+Data volume UL.

Step 3: Calculate Energy consumed per kilobit, Ec/Kb=Et/Total Data Volume.

Step 4: Identify the LTE sites clutter information and assign it a clutter in 4 categories, rural, sub-urban, urban and dense-urban.

Step 5: Identify the band, carrier bandwidth, transmit power, and hardware information (baseband+radio) for all LTE sites.

Step 6: Identify the parameters impacting the LTE site's coverage, energy efficient features, site's configuration and bad radio samples.

Step 7: Tabulate all information gathered from step 3 to step 6 on hourly/daily/weekly level.

Step 8: Assign the cluster/region/zone information to each site in the list.

Step 9: Sort the daily value of Et/Kb in the list in descending order.

Step 10: Use the unique combination of values identified in step 4 and 5 and assign these unique combination a category number (1, 2, 3, etc.).

Step 11: Within each category, assign a rank to the sites falling in that category. For example, if there are 3 categories (1, 2, and 3) and in category 1 there are 11 sites, then assign 1st rank to site with highest value of Ec/Kb, rank 2nd to the next highest value of Ec/Kb, so on so forth for all 11 sites. Apply the same logic to category 2 and 3.

Figure 4:
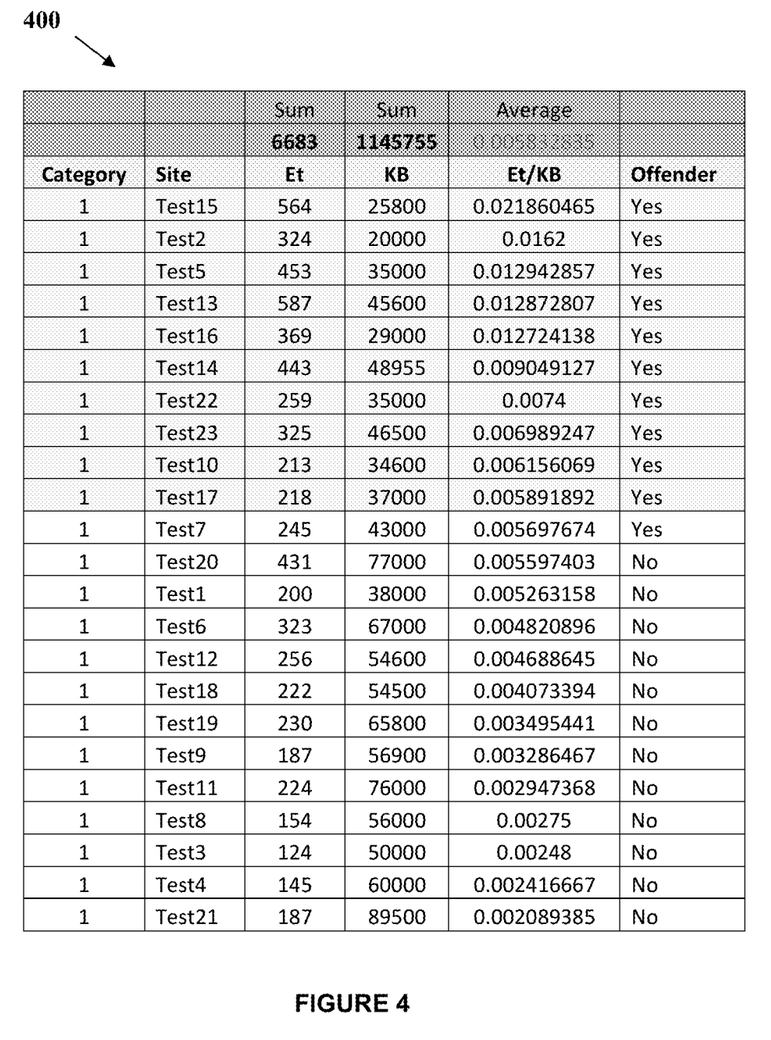
FIG. 4 shows a table, in accordance with one example.

Step 12: Worst offender identification: within each category, the top most ranked site is the worst offender. FIG. 4 shows a table 400 illustrating results, in accordance with this example.

The logic for offender calculation is: sites with Et/KB>Avg of Et/KB of all sites in a category. For example, the table 400 for category 1 with 23 sites, the average value of Et/KB is 0.005832835, thus sites, Test15, Test2, Test5, Test13, Test16, Test14, Test22, Test 23, Test 10 & Test 17 are offenders and rest all sites are non-offenders.

In order to prioritize a specific category out of a series of categories in a network, a network specific parameter "minvolumedifference" can be defined. The sites with minimum value of delta KB [KB (offender, worst site)−KB (Non-offender, best site)] where delta KB<minvolumedifference can be prioritized over other sites. In this example: KB (offender, worst site)=25800; KB (Non-offender, best site) =89500.

Step 13: Root cause analysis (RCA): RCA can be performed on information gathered in step 6 and on hourly values collected in step 7. Step 13: Delta of parameter set and feature set and its value is calculated between Top offender and best performing cells with reference to step 6.

Step 14: If the delta is >0, then populate a comparison of parameters and features captured in step 6 for offender and non-offender sites.

Step 15: If delta is =0, then perform analysis on individual energy consumption ratio: Eg/Et, Eb/Et and Ee/Et for offender and non-offender sites per category identified in step 10.

Step 16: Compare the each ratio of offender site with respect to the non-offender site and identify the root cause with relevant notification/flag.

By maintaining the records of energy consumption and data volume for all sites, the parameter "minvolumedifference" can be auto-tuned to an extent until most of the sites are optimized from energy consumption perspective. Initially this parameter can be higher and as and when the number of categories start getting reduced it will auto set to a more stringent value.

By maintaining the records of all parameter set (pi) and feature set (fi), and with recommendations of the best set of parameters and features at each iteration from energy consumption perspective, i.e. the parameter and feature values for the site with the lowest energy consumption across all categories in the data set, can be identified and can be used to auto-tune the network to achieve overall energy efficiency.

This aspect of machine learning will play a very significant role in a multi-vendor environment. This can provide a deep insight of vendor specific features/parameters and help the service provider in benchmarking their multi-vendor network and thus in identifying the best vendor from energy efficiency perspective.

The benefits of this implementation include OPEX saving, power saving, having a positive impact on the environment, and curtailing of power theft related malpractice.

In one embodiment, a new parameter entity may also be used: Et (Total Energy)=Eg+Eb+Ee [energy consumed through generator (Eg), battery (Eb) and main electricity (Ee)]. A new parameter "minvolumedifference" may be introduced to identify sites and categories with similar data volume and high delta in energy consumption. Introduction of categories may be based on combination of clutter, band, carrier bandwidth, transmit power, and hardware.

In the context of the present description: Eg refers to Energy consumed by generator; Eb refers to Energy consumed by battery; Ee refers to Energy consumed by electric supply; Et refers to Total energy consumed (Eg+Eb+Ee); KB refers to Total data volume in Kilo Bytes; Vdl refers to downline data volume in KB; Vul refers to Uplink data volume in KB; minvolumedifference refers to minimum difference of data volume in KB, a threshold value which can be defined in system; pi refers to parameter set; fi refers to feature set; and pi/fi refers to parameter set per feature set.

Figure 5:
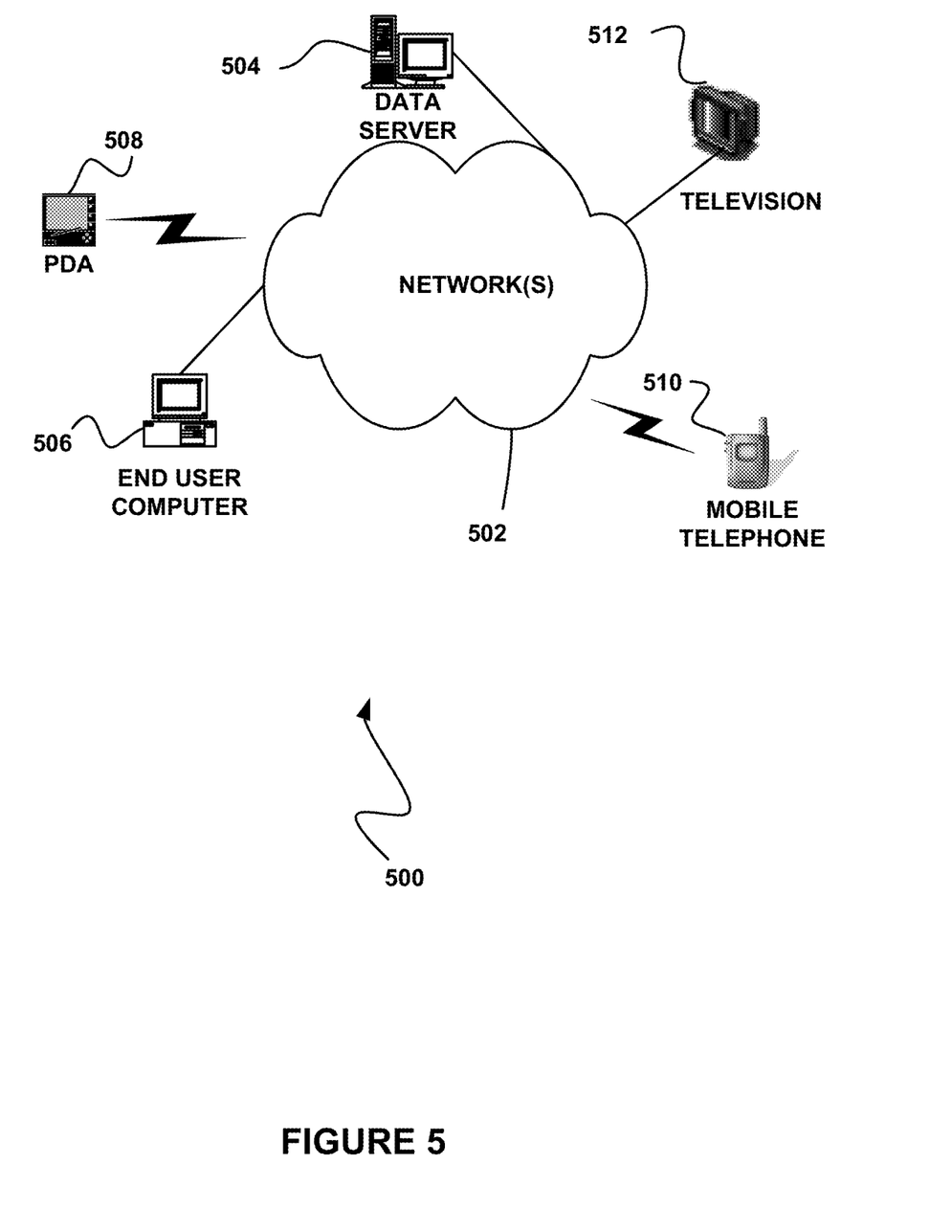
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
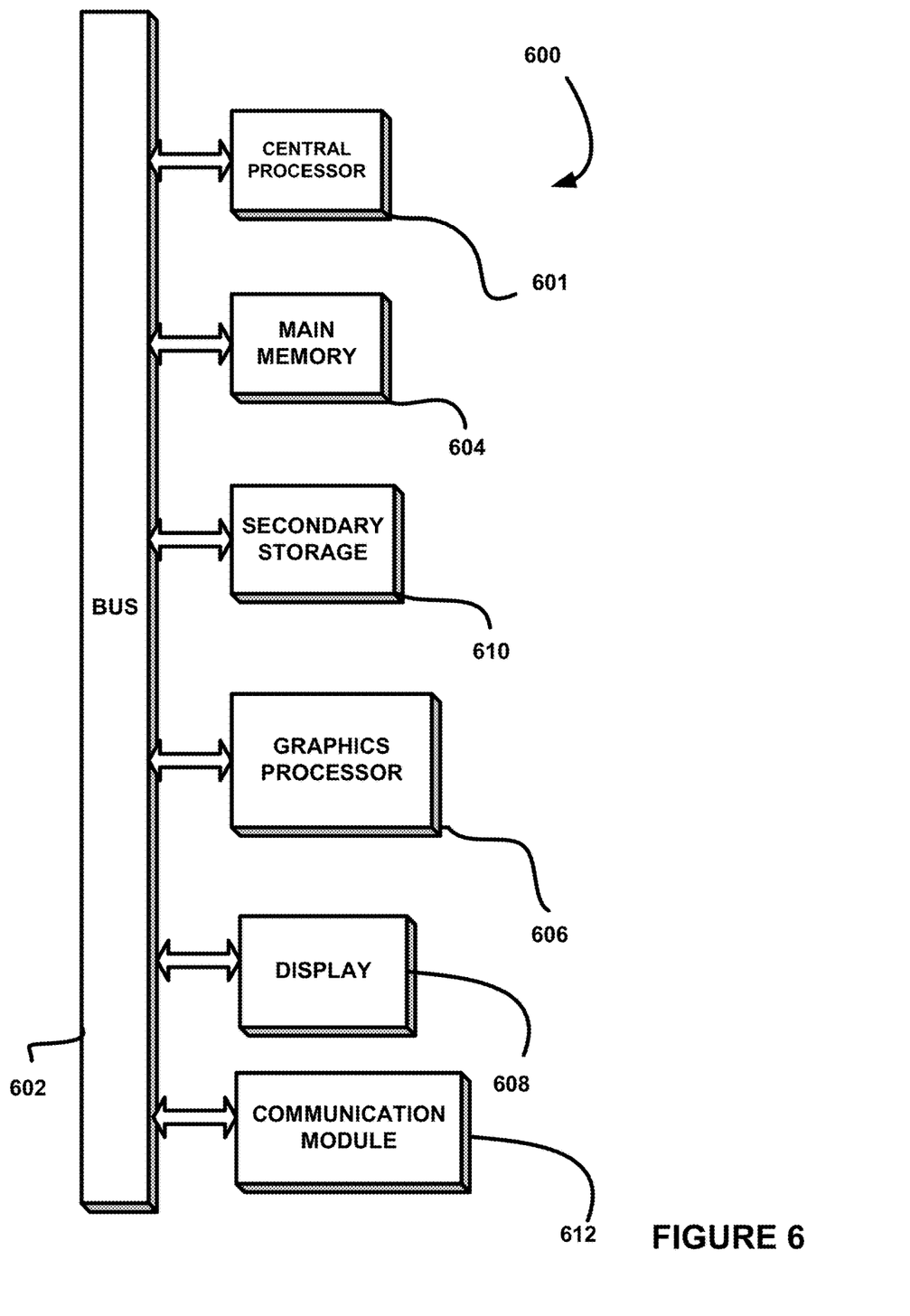
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   correlating, by a system, information including site configuration details, Radio Access Network (RAN) attributes, and energy consumption attributes for each area of a plurality of areas that includes a site having different parameters and features;
   for each area of the plurality of areas:
      determining, by the system, one area type of a plurality of area types as being associated with the area, wherein each area type of the plurality of area types is characterized by a particular configuration and traffic pattern, and wherein the area type is determined as being associated with the area based on the site configuration details and the RAN attributes for the area correlating with the particular configuration and traffic pattern characterizing the area type, and assigning, by the system, the area to the determined area type; and for each area type of the plurality of area types:

ranking, by the system, areas assigned to the area type by energy consumption indicated by the energy consumption attributes for the areas assigned to the area type, identifying, by the system, a top ranked area assigned to the area type as consuming more energy than a first set of remaining areas assigned to the area type, performing, by the system, a root cause analysis on the one or more areas to determine a cause for the energy consumption by the one or more areas being more than the remaining areas assigned to the area type;

identifying, by the system, an optimal area of the plurality of areas as having a lowest energy consumption across all of the area types; and auto-tuning, by the system, the network using parameters and features of the site included in the optimal area to achieve overall energy efficiency.

2. The method of claim 1, wherein the energy consumption attributes include an hourly calculation of energy consumed for each of the plurality of areas.

3. The method of claim 1, wherein the RAN attributes include a value of a total volume of data consumed for each of the plurality of areas.

4. The method of claim 1, wherein the plurality of area types include a rural area, a sub-urban area, an urban area, and a dense-urban area.

5. The method of claim 1, wherein the site configuration details are associated with one or more of band, carrier bandwidth, transmit power, and hardware information.

6. The method of claim 1, wherein the sites included in the plurality of areas include different cell sizes and network technologies.

7. A computer program product embodied on a non-transitory computer readable medium, comprising computer code for:

correlating, by a system, information including site configuration details, Radio Access Network (RAN) attributes, and energy consumption attributes for each area of a plurality of areas that includes a site having different parameters and features;

for each area of the plurality of areas:

determining, by the system, one area type of a plurality of area types as being associated with the area, wherein each area type of the plurality of area types is characterized by a particular configuration and traffic pattern, and wherein the area type is determined as being associated with the area based on the site configuration details and the RAN attributes for the area correlating with the particular configuration and traffic pattern characterizing the area type, and assigning, by the system, the area to the determined area type; and for each area type of the plurality of area types:

ranking, by the system, areas assigned to the area type by energy consumption indicated by the energy consumption attributes for the areas assigned to the area type, identifying, by the system, a top ranked area assigned to the area type as consuming more energy than a first set of remaining areas assigned to the area type, performing, by the system, a root cause analysis on the one or more areas to determine a cause for the energy consumption by the one or more areas being more than the remaining areas assigned to the area type;

identifying, by the system, an optimal area of the plurality of areas as having a lowest energy consumption across all of the area types; and auto-tuning, by the system, the network using parameters and features of the site included in the optimal area to achieve overall energy efficiency.

8. The computer program product of claim 7, wherein the energy consumption attributes include an hourly calculation of energy consumed for each of the plurality of areas.

9. The computer program product of claim 7, wherein the RAN attributes include a value of a total volume of data consumed for each of the plurality of areas.

10. The computer program product of claim 7, wherein the plurality of area types include a rural area, a sub-urban area, an urban area, and a dense-urban area.

11. The computer program product of claim 7, wherein the site configuration details are associated with one or more of band, carrier bandwidth, transmit power, and hardware information.

12. A system, comprising one or more processors, operable for:

correlating, by the system, information including site configuration details, Radio Access Network (RAN) attributes, and energy consumption attributes for each area of a plurality of areas that includes a site having different parameters and features;

for each area of the plurality of areas:

determining, by the system, one area type of a plurality of area types as being associated with the area, wherein each area type of the plurality of area types is characterized by a particular configuration and traffic pattern, and wherein the area type is determined as being associated with the area based on the site configuration details and the RAN attributes for the area correlating with the particular configuration and traffic pattern characterizing the area type, and assigning, by the system, the area to the determined area type; and for each area type of the plurality of area types:

ranking, by the system, areas assigned to the area type by energy consumption indicated by the energy consumption attributes for the areas assigned to the area type, identifying, by the system, a top ranked area assigned to the area type as consuming more energy than a first set of remaining areas assigned to the area type, performing, by the system, a root cause analysis on the one or more areas to determine a cause for the energy consumption by the one or more areas being more than the remaining areas assigned to the area type;

identifying, by the system, an optimal area of the plurality of areas as having a lowest energy consumption across all of the area types; and auto-tuning, by the system, the network using parameters and features of the site included in the optimal area to achieve overall energy efficiency.

13. The system of claim 12, wherein the energy consumption attributes include an hourly calculation of energy consumed for each of the plurality of areas.

14. The system of claim 12, wherein the RAN attributes include a value of a total volume of data consumed for each of the plurality of areas.

15. The system of claim 12, wherein the plurality of area types include a rural area, a sub-urban area, an urban area, and a dense-urban area.

16. The system of claim 12, wherein the site configuration details are associated with one or more of band, carrier bandwidth, transmit power, and hardware information.

\* \* \* \* \*